United States Patent
Kuzumaki et al.

(10) Patent No.: US 11,192,521 B2
(45) Date of Patent: Dec. 7, 2021

(54) VEHICULAR SEAT BELT DEVICE

(71) Applicant: Toyota Jidosha Kabushiki Kaisha, Toyota (JP)

(72) Inventors: Seigo Kuzumaki, Nagoya (JP); Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/775,922

(22) Filed: Jan. 29, 2020

(65) Prior Publication Data

US 2020/0247355 A1 Aug. 6, 2020

(30) Foreign Application Priority Data

Feb. 4, 2019 (JP) .............................. JP2019-018179

(51) Int. Cl.
*B60R 22/36* (2006.01)
*B60R 21/013* (2006.01)

(52) U.S. Cl.
CPC ............ *B60R 22/36* (2013.01); *B60R 21/013* (2013.01)

(58) Field of Classification Search
CPC ............ B60R 2022/4609; B60R 22/36; B60R 22/343; B60R 22/46; B60R 2022/4666; B60R 21/013; B60R 2021/01272; B60R 22/48; B60R 2022/028; B60R 22/195; B60R 2022/1957
USPC .......................................................... 180/268
See application file for complete search history.

(56) References Cited

U.S. PATENT DOCUMENTS

| 6,702,326 B1* | 3/2004 | Fujii | B60R 22/44 180/268 |
| 9,067,555 B1* | 6/2015 | Deng | B60R 21/013 |
| 2002/0113425 A1 | 8/2002 | Betz et al. | |
| 2004/0036345 A1* | 2/2004 | Herberg | B60R 22/44 297/480 |
| 2016/0129868 A1* | 5/2016 | Choi | B60R 21/01552 280/735 |

FOREIGN PATENT DOCUMENTS

| DE | 4428921 A1 * | 3/1995 | ........... B60R 22/185 |
| DE | 10329023 A1 * | 1/2005 | ......... B60R 21/0132 |

(Continued)

OTHER PUBLICATIONS

Kore, Vehicle Seat Belt Device, May 27, 2004, EPO, JP 2004148968 A, Machine Translation of Description (Year: 2004).*

(Continued)

*Primary Examiner* — James A English
*Assistant Examiner* — Matthew D Lee
(74) *Attorney, Agent, or Firm* — Dinsmore & Shohl LLP

(57) ABSTRACT

A vehicular seat belt device includes a first pretensioner provided in a retractor and configured to apply tensile force to a shoulder belt portion of a webbing, a second pretensioner provided in a belt anchor part and configured to apply tensile force to a lap belt portion of the webbing, a third pretensioner provided in a side portion of the vehicle seat opposite to the belt anchor part and configured to apply tensile force to the lap belt portion via a buckle, and a controller. The controller is configured to activate the first pretensioner at a time of predicting vehicle collision, and activate the second pretensioner and the third pretensioner after detection of collision.

12 Claims, 8 Drawing Sheets

(56) References Cited

FOREIGN PATENT DOCUMENTS

| DE | 102012004007 A1 | * | 8/2013 | ........... B60R 21/013 |
|----|----|----|----|----|
| DE | 102012004007 A1 | | 8/2013 | |
| DE | 102018107992 A1 | * | 10/2018 | ......... B60R 22/1952 |
| JP | 2001-287622 A | | 10/2001 | |
| JP | 2002-308047 A | | 10/2002 | |
| JP | 2004-148968 A | | 5/2004 | |
| JP | 2004148968 A | * | 5/2004 | |
| JP | 2005-138756 A | | 6/2005 | |
| JP | 2018-135036 A | | 8/2018 | |
| JP | 2018-176845 A | | 11/2018 | |

OTHER PUBLICATIONS

Renz, Belt Pretensioner Arrangement for Motor Vehicle Seat Belt, Comprises First Sensor Co-acting With a Second Belt Pretensioner Unit and Activating it by Operation of the First Belt Pretensioner Unit, Jan. 13, 2005, EPO, DE 10329023 A1, Machine Translation of Description (Year: 2005).*

* cited by examiner

VEHICULAR SEAT BELT DEVICE

CROSS-REFERENCE TO RELATED APPLICATIONS

This application claims priority to Japanese Patent Application No. 2019-018179 filed on Feb. 4, 2019, which is incorporated herein by reference in its entirety including the specification, drawings and abstract.

BACKGROUND

1. Technical Field

The disclosure relates to a vehicular seat belt device.

2. Description of Related Art

A vehicular seat belt device described in Japanese Unexamined Patent Application Publication No. 2004-148968 (JP 2004-148968 A) has a first pretensioner that is provided in a buckle portion and is activated at the time of collision, a second pretensioner provided in a retractor portion, and a third pretensioner provided in a lap anchor portion. In the seat belt device of JP 2004-148968 A, the first pretensioner is activated at the time of collision (when an accident occurs), and the second pretensioner and the third pretensioner are activated when the risk of an accident of the vehicle is at a high level.

SUMMARY

In the seat belt device of JP 2004-148968 A, the second pretensioner and the third pretensioner are activated when a collision of the vehicle is predicted, so that tensile force is applied to a shoulder belt portion and a lap belt portion of a webbing. As a result, the buckle may fall onto the occupant side in the vehicle width direction. In this case, the lap belt portion may be detached from the waist region (the pelvis) of the occupant, thus leaving some room for improvement.

This disclosure provides a vehicular seat belt device which has pretensioners that are respectively activated at the time of collision of a vehicle and at the time of prediction of collision, and which can reduce a possibility of detachment of a lap belt portion from the waist region of an occupant.

A first aspect of the disclosure is concerned with a vehicular seat belt. The vehicular seat belt includes a webbing having a first end portion that is wound on a retractor, and a second end portion that is attached to a belt anchor part disposed in a side portion of a vehicle seat, a first pretensioner provided in the retractor and configured to apply tensile force to a shoulder belt portion when activated, a second pretensioner provided in the belt anchor part and configured to apply tensile force to a lap belt portion when activated, a third pretensioner provided in a side portion of the vehicle seat opposite to the belt anchor part, and configured to apply tensile force to the shoulder belt portion and the lap belt portion, via a buckle with which a tongue plate is engaged, and a controller. The webbing is passed through the tongue plate. The controller is configured to activate the first pretensioner at a time of predicting vehicle collision, and activate the second pretensioner and the third pretensioner after detection of collision. The webbing includes the shoulder belt portion configured to restrain an upper body of an occupant, and the lap belt portion configured to restrain a waist region of the occupant.

According to the first aspect, the first end portion of the webbing is wound on the retractor, and the second end portion is attached to the belt anchor part. Also, the webbing includes the shoulder belt portion that restrains the upper body of the occupant, and the lap belt portion that restrains the waist region of the occupant. Further, the buckle is provided in the side portion of the vehicle seat opposite to the belt anchor part, and the tongue plate, through which the webbing is passed, is engaged with the buckle.

Here, the retractor is provided with the first pretensioner, and tensile force is applied to the shoulder belt portion when the first pretensioner is activated. Also, the belt anchor part is provided with the second pretensioner, and tensile force is applied to the lap belt portion when the second pretensioner is activated. Further, the third pretensioner, when activated, applies tensile force to the shoulder belt portion and the lap belt portion via the buckle. The controller activates the first pretensioner when it predicts a collision of the vehicle. Thus, tensile force is applied to the shoulder belt portion before collision, so that the upper body of the occupant can be restrained onto the vehicle seat.

Also, the controller activates the second pretensioner and the third pretensioner after detection of collision, so as to apply tensile force to the lap belt portion. Thus, the waist region of the occupant can be made less likely or unlikely to be detached from the lap belt portion.

In the first aspect, the retractor may be provided in an upper portion of the vehicle seat, and the first pretensioner may be an electric pretensioner installed on the vehicle seat and configured to be driven when supplied with electric power.

With the above arrangement, the retractor can apply tensile force to the shoulder belt portion at a position closer to the occupant, as compared with the arrangement in which the retractor is provided on the main body of the vehicle. Thus, the amount of electric power required to activate the first pretensioner can be reduced, and the size of the pretensioner can be reduced.

In the first aspect, the second pretensioner and the third pretensioner may be electric pretensioners installed on the vehicle seat and configured to be driven when supplied with electric power.

With the above arrangement in which the first pretensioner, second pretensioner, and third pretensioner are electric pretensioners, tensile force applied to the webbing can be easily adjusted.

In the first aspect, the controller may be configured to increase tensile force applied from the first pretensioner to the shoulder belt portion after the detection of the collision, such that the tensile force becomes larger than tensile force applied from the first pretensioner to the shoulder belt portion at the time of the predicting vehicle collision.

With the above arrangement, the shoulder belt portion can be fastened more tightly after detection of collision.

In the first aspect, the webbing may be configured to be inhibited from being pulled out from the retractor, after the tensile force applied from the first pretensioner to the shoulder belt portion is increased.

With the above arrangement, the webbing is inhibited from being pulled out from the retractor; thus, the load of the webbing can be increased as the occupant moves forward of the vehicle due to the inertia after collision.

In the first aspect, the controller may be configured to activate at least one of the second pretensioner and the third pretensioner, at the time of the predicting vehicle collision when a seat back of the vehicle seat is in a reclined state in which the seat back is tilted by an angle that is larger than a predetermined angle, and then activate the first pretensioner.

With the above arrangement, when a collision is predicted while the seat back is in the reclined state, at least one of the second pretensioner and the third pretensioner is activated by the controller. As a result, tensile force is preferentially applied to the lap belt portion, so as to restrain the waist region of the occupant, thus making it possible to curb occurrence of a so-called submarine phenomenon in which the occupant slides forward of the seat, under the lap belt portion.

In the first aspect, the controller may be configured to activate the first pretensioner after the detection of the collision.

With the above arrangement, the first pretensioner is activated after detection of collision, so that tensile force can be applied to the should belt portion, in a condition where the upper body of the occupant in the reclined posture is raised due to the inertial force.

In the first aspect, the controller may be configured to activate the first pretensioner, at the time of the predicting vehicle collision when a seat back of the vehicle seat is in a driving state in which the seat back is stood up by an angle that is larger than a predetermined angle, and activate the second pretensioner and the third pretensioner after detection of collision.

In the first aspect, the controller may be configured to activate the first pretensioner within a period after prediction of the collision and before the detection of the collision.

According to the first aspect of the disclosure, in the arrangement including the pretensioners that are respectively activated at the time of collision of the vehicle and at the time of prediction of collision, the possibility of detachment of the lap belt portion from the waist region of the occupant can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A vehicular seat belt device 10 according to a first embodiment will be described with reference to the drawings. In some of the drawings, arrow FR indicates the vehicle front direction, arrow UP indicates the vehicle upper direction, while arrow RH indicates the right-hand side of the vehicle. When the front, rear, right, left, upper and lower directions are mentioned in the following description, these directions refer to the front and rear sides in the vehicle longitudinal direction, right and left sides in the vehicle width direction, and upper and lower sides in the vehicle vertical direction, respectively, unless otherwise specified.

Figure 1:
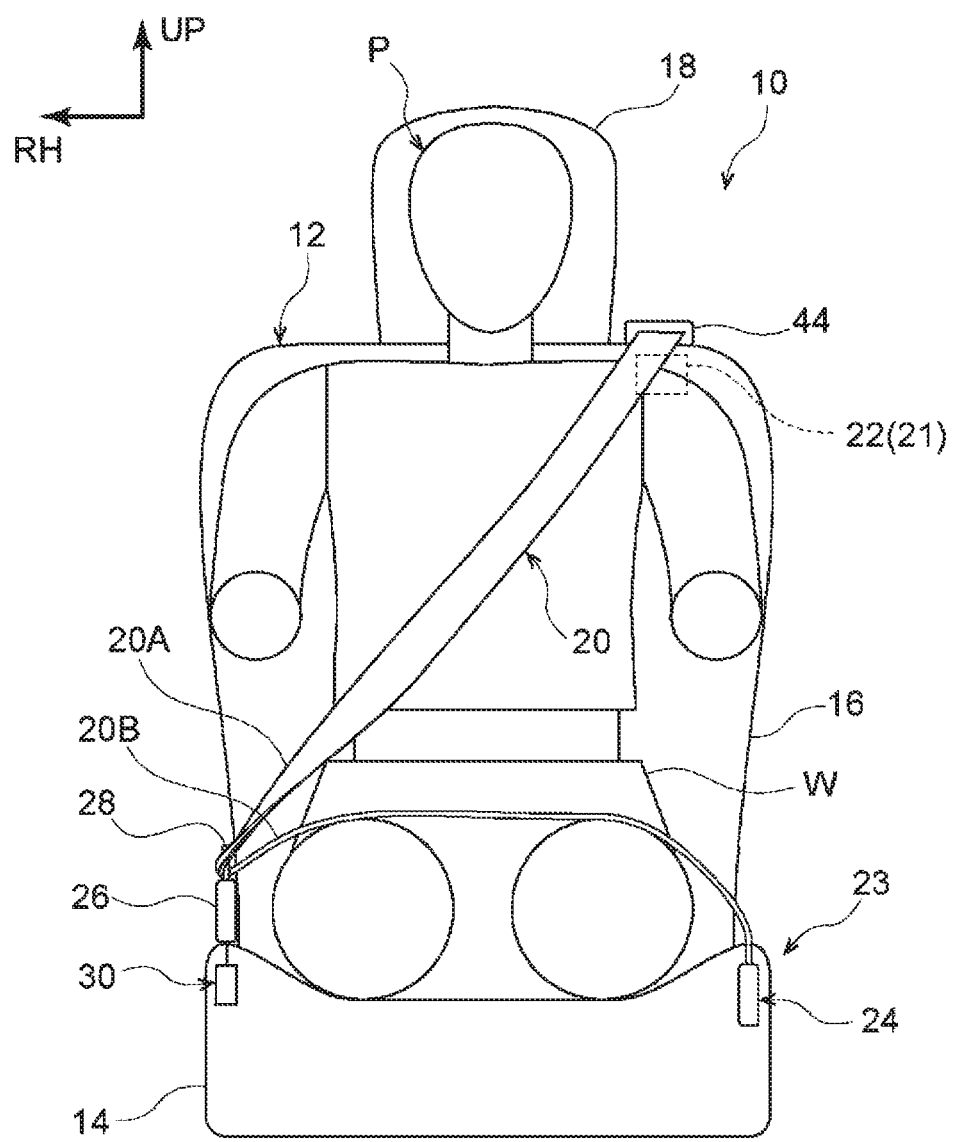
FIG. 1 is a front view of a vehicle seat using a vehicular seat belt device according to a first embodiment.

As shown in FIG. 1, a vehicle seat 12 using the vehicular seat belt device 10 according to this embodiment includes a seat cushion 14, seat back 16, and headrest 18. In this embodiment, as one example, the longitudinal direction of the vehicle coincides with the seat longitudinal direction of the vehicle seat 12. Also, in this embodiment, the vehicle seat 12 is the driver's seat of a left-hand-drive car.

The seat cushion 14 provides a lower portion of the vehicle seat 12, and the thighs and buttocks of an occupant P are supported by the seat cushion 14, from the vehicle lower side. Also, the seat back 16 is rotatably coupled to a rear end portion of the seat cushion 14.

The seat back 16 extends upward of the vehicle from the rear end portion of the seat cushion 14, and the back of the occupant P is supported by the seat back 16 from the vehicle rear side. Also, the seat back 16 can be tilted back, relative to the seat cushion 14, so as to be placed in a reclined state, and the occupant P can take a relaxed posture when the seat back 16 is in the reclined state.

The headrest 18 is provided at an upper end portion of the seat back 16, and the head of the occupant P is supported by the headrest 18 from the vehicle rear side.

Vehicular Seat Belt Device 10

The vehicular seat belt device 10 according to this embodiment includes a webbing 20, retractor 21, belt anchor part 23, tongue plate 28, and buckle 26. The webbing 20 is formed of a band-like cloth, and one end portion of the webbing 20 is wound on the retractor 21 in the seat back 16. The other end portion of the webbing 20 is attached to the belt anchor part 23 disposed in a vehicle left-side portion of the vehicle seat 12. The buckle 26 is disposed in a vehicle right-side portion of the vehicle seat 12. Namely, the buckle 26 is provided in the side portion of the vehicle seat 12 opposite to the belt anchor part 23.

The webbing 20 includes a shoulder belt portion 20A that restrains the upper body of the occupant P, and a lap belt portion 20B that restrains the waist region W of the occupant P. More specifically, in a condition where the tongue plate 28 is engaged with the buckle 26, the shoulder belt portion 20A of the webbing 20 extends obliquely from the vehicle left side in an upper end portion of the seat back 16, to the vehicle right side in a lower end portion of the seat back 16, and is passed through the tongue plate 28. Also, the lap belt portion 20B of the webbing 20 extends from the tongue plate 28 to the vehicle left side, and is attached to the belt anchor part 23.

Figure 4:
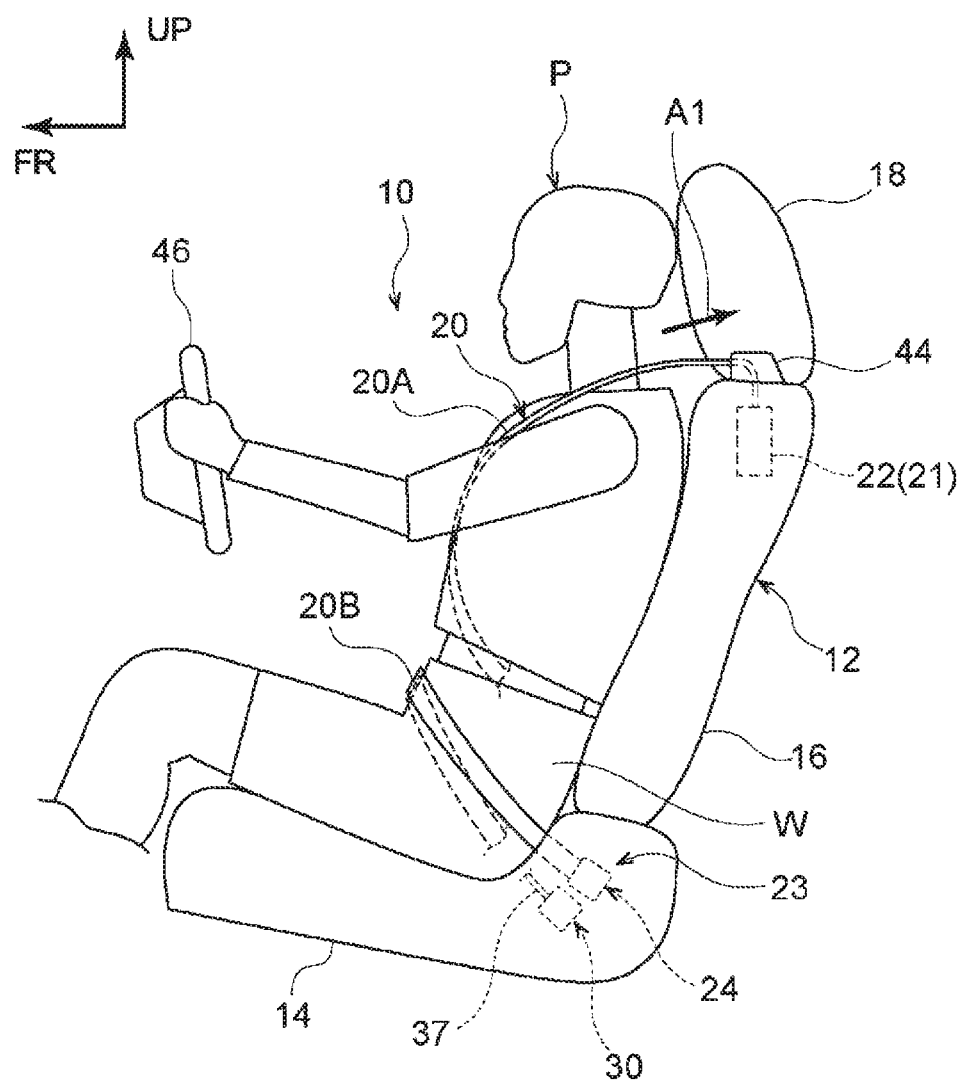
FIG. 4 is a side view of the vehicle seat using the vehicular seat belt device according to the first embodiment, in a condition where a collision of a vehicle is predicted.

As shown in FIG. 4, a belt guide portion 44 is provided in the upper end portion of the seat back 16. The webbing 20 is passed through the belt guide portion 44, and the belt guide portion 44 guides the webbing 20 such that the webbing 20 is pulled out from above the left shoulder of the occupant P.

One end portion of the webbing 20 passed through the belt guide portion 44 is extended downward in the seat back 16, and connected to the retractor 21. Then, the webbing 20 is wound around a spool (not shown) provided in the retractor 21. Here, a first pretensioner 22 is provided in the retractor 21, and the first pretensioner 22 is operable to apply tensile force to the shoulder belt portion 20A. The first pretensioner 22 is an electric pretensioner that is driven when supplied with electric power. The first pretensioner 22, which has the same configuration as a second pretensioner 24 that will be described later, will not be described in detail.

As shown in FIG. 1, the belt anchor part 23 is disposed in the vehicle left-side portion of the vehicle seat 12, and is fixed to a seat cushion frame (not shown) that constitutes the seat cushion 14. The second pretensioner 24 is provided in the belt anchor part 23.

Figure 2:
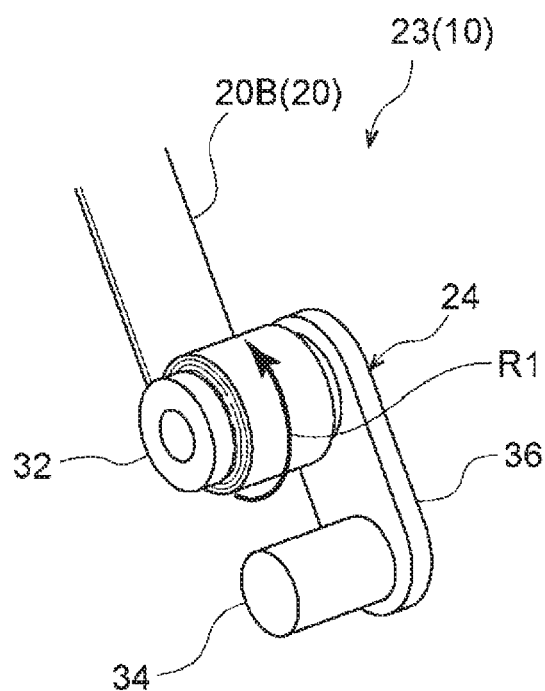
FIG. 2 is a perspective view showing a belt anchor part and a principal part of a second pretensioner in the first embodiment.

As shown in FIG. 2, the second pretensioner 24 includes a spool 32, a motor 34, and a gear unit 36. The spool 32 is formed in a generally cylindrical shape, and is rotatably attached to one end portion of the gear unit 36. Then, the other end portion of the webbing 20 is wound around an outer circumferential surface of the spool 32.

The motor 34 is provided on the other end portion of the gear unit 36, and a wire harness (not shown) for supplying electric power is connected to the motor 34. The gear unit 36 consists of two or more gears that connect a rotary shaft of the motor 34 with the spool 32. When the motor 34 is driven, the gear unit 36 transmits torque of the motor 34 to the spool 32.

The second pretensioner 24, which is constructed as described above, operates when the motor 34 is driven with electric power supplied to the motor 34. With the motor 34 thus driven, the spool 32 rotates in a direction of arrow R1 in FIG. 2, so that the lap belt portion 20B is taken up or wound on the spool 32. In this manner, tensile force is applied to the lap belt portion 20B.

When supply of electric power to the motor 34 is stopped, the spool 32 is made free, so that the lap belt portion 20B can be pulled out. While electric power is supplied to the motor 34, the spool 32 is locked so as not to rotate in the reverse direction. Namely, the second pretensioner 24 is arranged to be able to inhibit the lap belt portion 20B from being pulled out, and the first pretensioner 22 is also arranged to be able to inhibit the shoulder belt portion 20A from being pulled out.

As shown in FIG. 1, a third pretensioner 30 is connected to the buckle 26. The third pretensioner 30 is located inside the seat cushion 14, and is fixed to the seat cushion frame (not shown).

Figure 3:
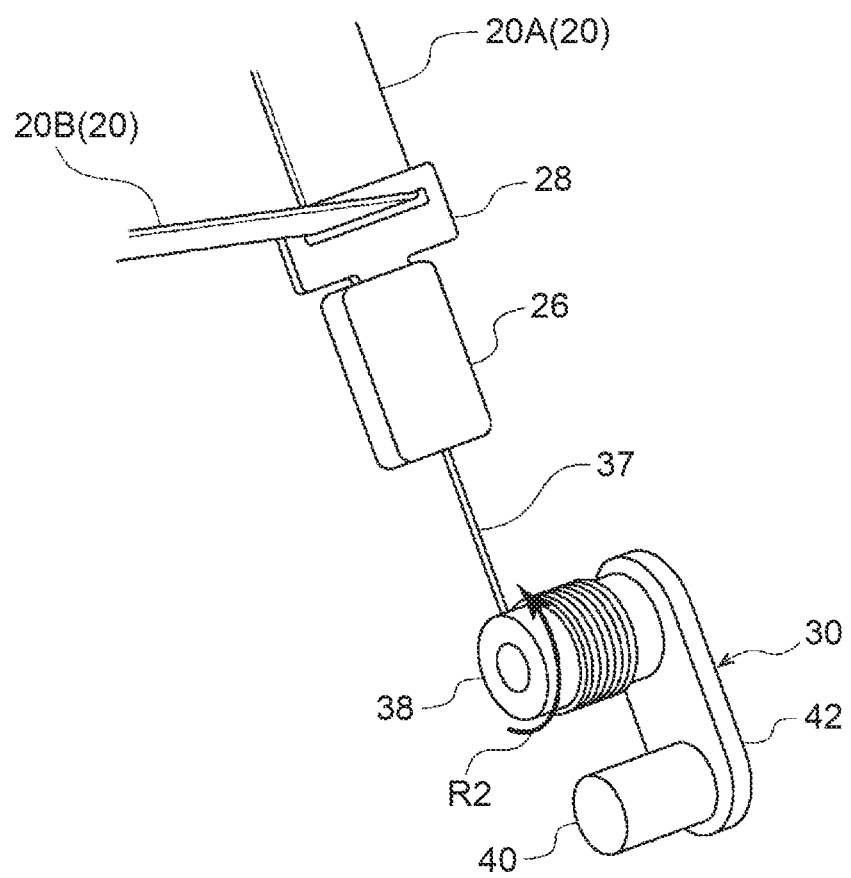
FIG. 3 is a perspective view showing a buckle and a principal part of a third pretensioner in the first embodiment.

As shown in FIG. 3, the third pretensioner 30 includes a wire 37, a spool 38, a motor 40, and a gear unit 42. One end portion of the wire 37 is fixed to a lower end portion of the buckle 26, and the other end portion of the wire 37 is wound around an outer circumferential surface of the spool 38.

The spool 38 is formed in a generally cylindrical shape, and is rotatably attached to one end portion of the gear unit 42. The motor 40 is provided on the other end portion of the gear unit 42, and a wire harness (not shown) for supplying electric power is connected to the motor 40. The gear unit 42 consists of two or more gears that connect a rotary shaft of the motor 40 with the spool 38. When the motor 40 is driven, the gear unit 42 transmits torque of the motor 40 to the spool 38.

The third pretensioner 30, which is constructed as described above, operates when the motor 40 is driven with electric power supplied to the motor 40. With the motor 40 thus driven, the spool 38 rotates in a direction of arrow R2 in FIG. 3, so that the wire 37 is taken up or wound on the spool 38. In this manner, the buckle 26 is pulled, and tensile force is applied to the lap belt portion 20B. Namely, the third pretensioner 30 is arranged to apply tensile force to the lap belt portion 20B, via the buckle 26 with which the tongue plate 28 is engaged.

Figure 5:
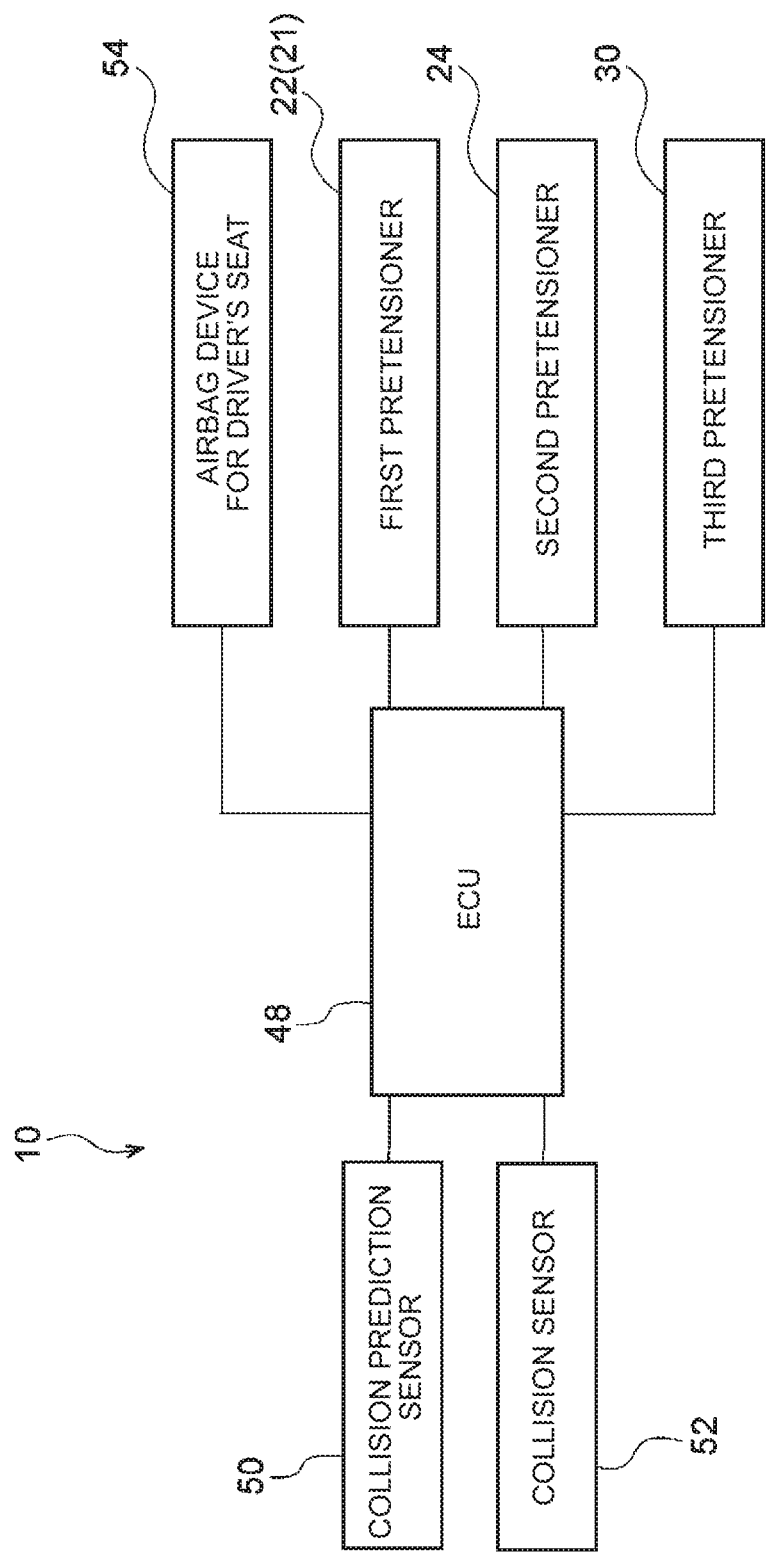
FIG. 5 is a block diagram showing the hardware configuration of the vehicular seat belt device according to the first embodiment.

FIG. 5 is a block diagram showing the hardware configuration of the vehicular seat belt device 10 of this embodiment. As shown in FIG. 5, the vehicular seat belt device 10 includes an electronic control unit (ECU) 48 as a controller. Also, the ECU 48 is electrically connected to a collision prediction sensor 50, a collision sensor 52, airbag device 54 for the driver's seat, first pretensioner 22, second pretensioner 24, and third pretensioner 30.

The collision prediction sensor 50 is a pre-crash sensor that predicts collision or crash and includes a millimeter-wave radar, laser radar, or vehicle-mounted camera, for example. In operation, collision (in particular, frontal collision) of the vehicle is predicted based on a signal from the collision prediction sensor 50. The collision sensor 52 is a sensor that detects collision of the vehicle, and includes an acceleration sensor or a pressure sensor, for example. In operation, collision (in particular, frontal collision) of the vehicle is detected based on a signal from the collision sensor 52.

Figure 6:
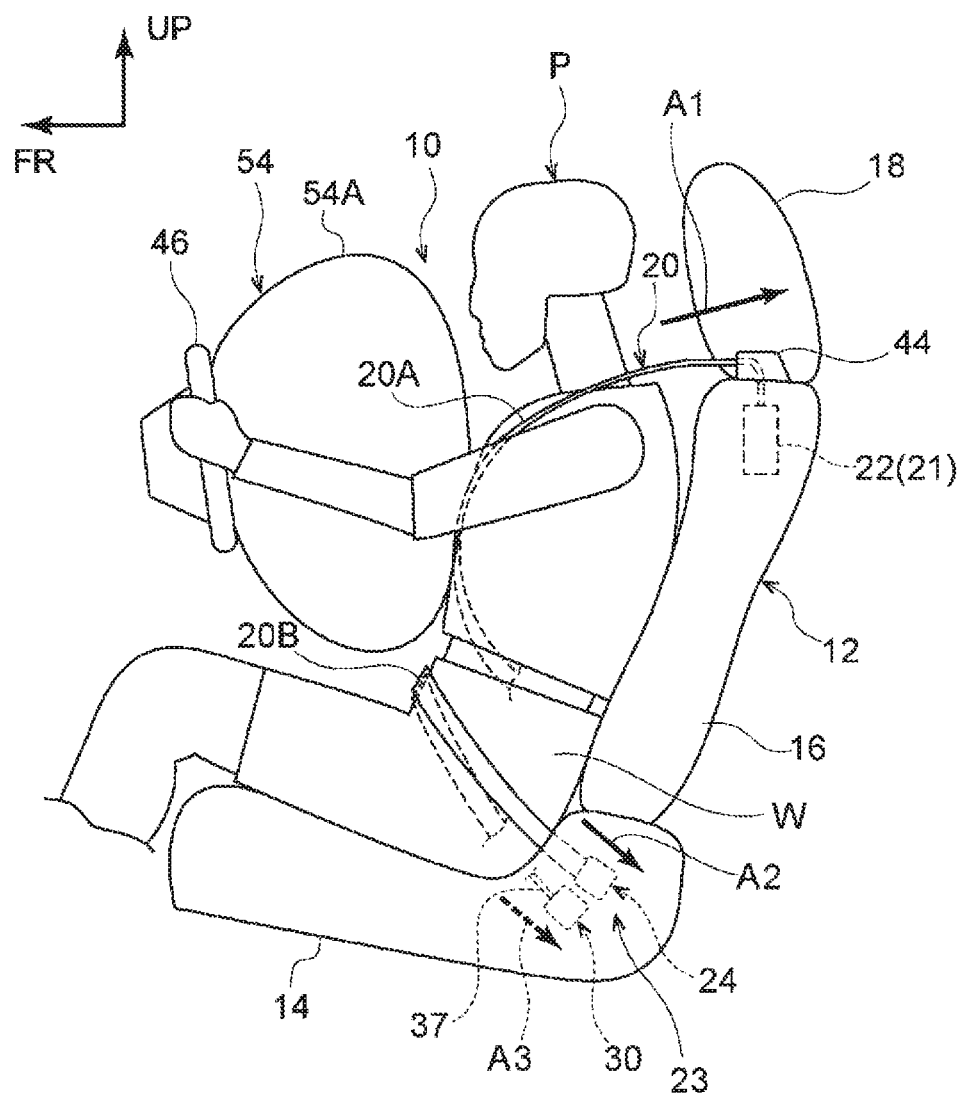
FIG. 6 is a view showing the case where the collision of the vehicle is detected, from the condition of FIG. 4.

As shown in FIG. 6, the airbag device 54 for the driver's seat includes an airbag 54A that is inflated and deployed from a pad of a steering wheel 46 toward the occupant P at the time of collision of the vehicle. Also, an inflator (not shown) that supplies gas to the airbag 54A is provided in the pad of the steering wheel 46. The airbag device 54 for the driver's seat includes the inflator and the airbag 54A. When a collision of the vehicle is detected by the collision sensor 52, the inflator is activated to supply gas to the airbag 54A, so that the airbag 54A is inflated and deployed. In this manner, the upper body of the occupant P is retrained.

In this embodiment, the ECU 48 activates the first pretensioner 22 at the time of the predicting vehicle collision in the case where the occupant is in a driving posture, and activates the second pretensioner 24 and the third pretensioner 30 at the same time after detection of the collision. The time of the predicting vehicle collision may be a point in time when a collision is predicted and before the collision is detected. Thus, at the time of prediction of vehicle collision in the case where the occupant is in a driving posture, the ECU 48 may activate the first pretensioner 22 within a period after a collision is predicted and before the collision is detected. The case where the occupant is in a driving posture may refer to the case where the seat back 16 stands closer to the upright position than that of the case where the seat back 16 is in a reclined state, such that the occupant seated on the vehicle seat 12 has a posture suitable for driving.

Operation

Next, the operation of this embodiment will be described using the graph of FIG. 7.

Figure 7:
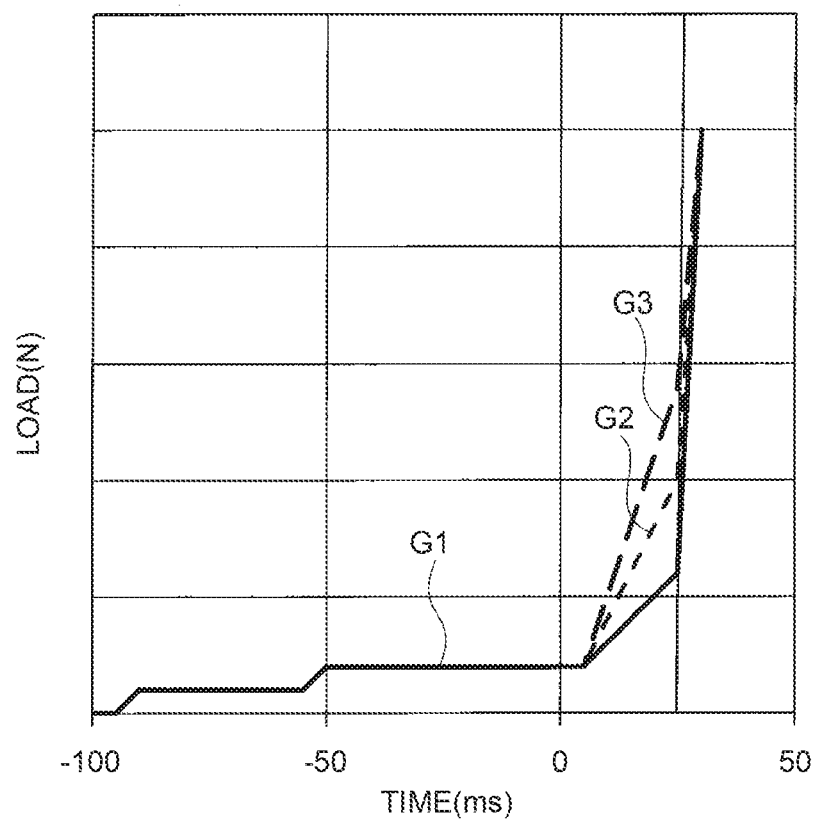
FIG. 7 is a graph showing the relationships between the load applied to a webbing and elapsed time in the first embodiment.

In FIG. 7, graphs G1, G2, G3 indicate the relationships between the load applied to the webbing 20, and elapsed time, in the first embodiment. In FIG. 7, the horizontal axis indicates time, and "0 ms" is the time of collision of the vehicle.

Graph G1 indicated by a solid line in FIG. 7 indicates a load applied to the shoulder belt portion 20A. Graph G2 indicated by a broken line in FIG. 7 indicates a total load obtained by adding a load applied to the vehicle right-hand side (buckle 26 side) of the lap belt portion 20B, to the load of graph G1. Graph G3 indicated by a broken line in FIG. 7 indicates a total load obtained by adding a load applied to the vehicle left-hand side (belt anchor part 23 side) of the lap belt portion 20B, to the load of graph G2.

As indicated by graph G01, the ECU 48 activates the first pretensioner 22, and increases the load of the shoulder belt portion 20A, when it predicts a collision of the vehicle based on a signal from the collision prediction sensor 50. As a result, tensile force is applied to the shoulder belt portion 20A before collision of the vehicle, as indicated by arrow A1 in FIG. 4, so that the upper body of the occupant P can be restrained onto the seat back 16.

Also, as indicated by graphs G2, G3, the ECU 48 activates the second pretensioner 24 and the third pretensioner 30 at the same time, after detecting collision of the vehicle based on a signal from the collision sensor 52, so as to increase the load of the lap belt portion 20B after collision. As a result, tensile force is applied to the lap belt portion 20B, as indicated by arrow A2 and arrow A3 in FIG. 6, so that the waist region W of the occupant P can be restrained.

At this time, the second pretensioner 24 and the third pretensioner 30 are activated after detection of collision, so that the lap belt portion 20B is pulled to the right and to the left at the same time. Thus, the waist region W of the occupant P is less likely or unlikely to be disengaged from the lap belt portion 20B. The phrase "at the same time" mentioned herein is not limited to the case where the time at which the second pretensioner 24 is activated coincides exactly with the time at which the third pretensioner 30 is activated. Namely, the phrase "at the same time" includes a concept where the time at which the second pretensioner 24 is activated slightly differs from the time at which the third pretensioner 30 is activated, as far as the lap belt portion 20B can be regarded as being pulled to the right and to the left substantially at the same time.

Also, in this embodiment, as indicated by graph G1 in FIG. 7, after collision of the vehicle is detected based on a signal from the collision sensor 52, the ECU 48 increases the tensile force applied from the first pretensioner 22 to the shoulder belt portion 20A, to be larger than that prior to collision. Thus, as indicated by arrow A1 in FIG. 6, the tensile force applied to the shoulder belt portion 20A is increased to be larger than that in the condition of FIG. 4. As a result, the shoulder belt portion 20A can be fastened more tightly after detection of collision.

Further, as shown in FIG. 7, after detection of collision, the webbing 20 is inhibited from being pulled out from the first pretensioner 22 and the second pretensioner 24. Thus, the loads applied to the shoulder belt portion 20A and the lap belt portion 20B increase while the occupant P is moving forward of the vehicle because of inertia after collision. Thus, the load of the webbing 20 can be increased as the occupant P moves forward of the vehicle because of inertia.

Further, in this embodiment, the retractor 21 is provided in the upper portion of the vehicle seat 12, as shown in FIG. 4, and the first pretensioner 22 is an electric pretensioner that is installed on the vehicle seat 12 and is adapted to be driven when supplied with electric power. Thus, it is possible to apply tensile force to the shoulder belt portion 20A at a position closer to the occupant P, as compared with the arrangement in which the retractor 21 is provided on the vehicle main body, such as a center pillar. Consequently, electric power required to activate the first pretensioner 22 can be reduced, and the size of the pretensioner can be reduced.

Similarly, the second pretensioner 24 and the third pretensioner 30 are electric pretensioners. Thus, since the first pretensioner 22, second pretensioner 24, and third pretensioner 30 are electric pretensioners, tensile force applied to the webbing 20 can be easily adjusted. Namely, in the case of an explosive pretensioner, it is difficult to adjust the load applied to the webbing 20; however, the use of the electric pretensioners makes it possible to adjust the load applied to the webbing 20, merely by adjusting current values. Also, since three electric pretensioners are used for applying tensile force to the webbing 20, the size of each pretensioner can be reduced, as compared with the case where one pretensioner is used.

Second Embodiment

Next, a vehicular seat belt device 60 according to a second embodiment will be described. The same reference numerals are assigned to the same components as those of the first embodiment, and description of these components will be omitted when appropriate.

The vehicular seat belt device 60 of this embodiment has substantially the same hardware configuration as that of the first embodiment, but the control method of this embodiment is different from that of the first embodiment. Namely, the vehicular seat belt device 60 includes the webbing 20 including the shoulder belt portion 20A and the lap belt portion 20B, and one end portion of the webbing 20 is wound on the retractor 21. The other end portion of the webbing 20 is attached to the belt anchor part 23.

In this embodiment, the seat back 16 of the vehicle seat 12 is in a reclined state in which the seat back 16 is tilted, and the occupant P takes a relaxed posture. The reclined state mentioned herein means a state in which the seat back 16 is tilted back, beyond the range of the tilting angle of the seat back 16 during normal driving. The ECU 48 may determine that the occupant P is in a driving posture when the seat back 16 is stood up by an angle larger than the predetermined angle (a driving state). The ECU 48 may determine that the occupant P is in a relaxed posture when the seat back 16 is tilted back by an angle larger than the predetermined angle (the reclined state).

As shown in FIG. 5, the vehicle seat 12 of this embodiment includes the ECU 48 as a controller, like the first embodiment. The ECU 48 is electrically connected to the collision prediction sensor 50, collision sensor 52, airbag device 54 for the driver's seat, first pretensioner 22, second pretensioner 24, and third pretensioner 30.

In this embodiment, the ECU 48 activates at least one of the second pretensioner 24 and the third pretensioner 30, when it predicts a collision of the vehicle while the seat back 16 is in the reclined state in which it is tilted by an angle that is larger than a predetermined angle. Then, the ECU 48 activates the first pretensioner 22. In this embodiment, in particular, the ECU 48 activates the second pretensioner 24 when it predicts a collision of the vehicle, and then activates the first pretensioner 22. Also, the ECU 48 activates the third pretensioner 30 after detecting the collision.

Operation

Next, the operation of this embodiment will be described using the graph of FIG. 9.

Figure 9:
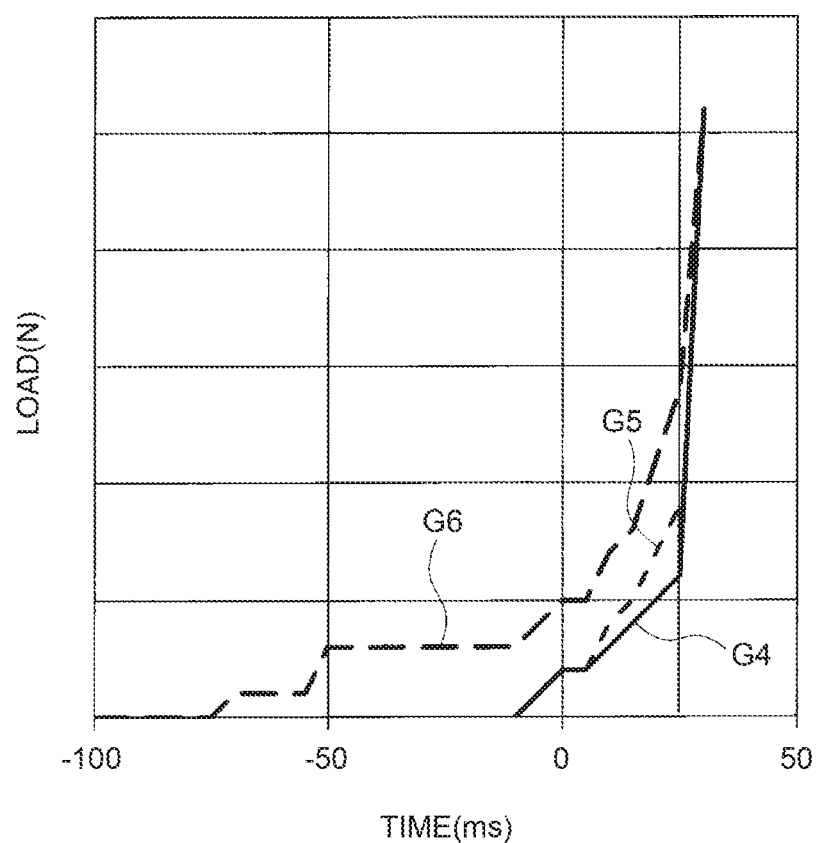
FIG. 9 is a graph showing the relationships between the load applied to a webbing and elapsed time in the second embodiment.

In FIG. 9, graphs G4, G5, G6 indicate the relationships between the load applied to the webbing 20, and elapsed time, in the second embodiment. In FIG. 9, the horizontal axis indicates time, and "0 ms" is the time of collision of the vehicle.

Graph G4 indicated by a solid line in FIG. 9 indicates a load applied to the shoulder belt portion 20A. Graph G5 indicated by a broken line in FIG. 9 indicates a total load obtained by adding a load applied to the vehicle right-hand side (buckle 26 side) of the lap belt portion 20B, to the load of the graph G4. Graph G6 indicated by a broken line in FIG. 9 indicates a total load obtained by adding a load applied to the vehicle left-hand side (belt anchor part 23 side) of the lap belt portion 20B, to the load of the graph G5.

As indicated by graph G6, the ECU 48 activates the second pretensioner 24 when it predicts a collision of the vehicle based on a signal from the collision prediction sensor 50, while the seat back 16 is in the reclined state in which it is tilted by an angle that is larger than the predetermined angle. Here, the angle of the seat back 16 is detected by using a reclining sensor (not shown) provided in the vehicle seat 12, for example.

Figure 8:
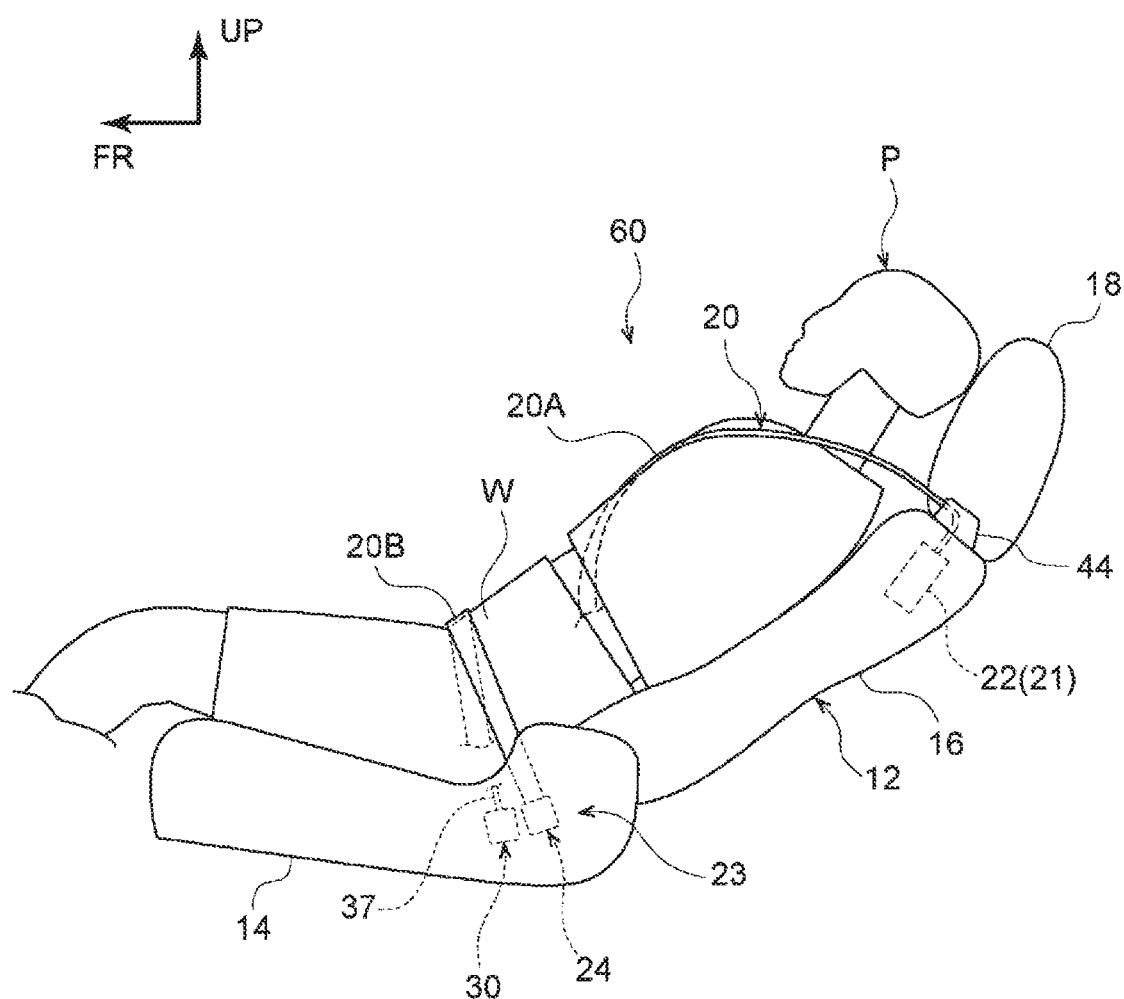
FIG. 8 is a side view of a vehicle seat using a vehicular seat belt device according to a second embodiment.

With the second pretensioner 24 thus activated by the ECU 48, the load of the lap belt portion 20B is increased. As a result, in FIG. 8, tensile force is applied to the lap belt portion 20B before collision of the vehicle, so that the waist region W of the occupant P can be restrained.

As indicated by graph G4 of FIG. 9, the first pretensioner 22 is activated by the ECU 48, after the second pretensioner 24 is activated, so that the load of the shoulder belt portion 20A is increased. Further, as indicated by graph G5, after detecting collision of the vehicle based on a signal from the collision sensor 52, the ECU 48 activates the third pretensioner 30, so as to increase the load of the lap belt portion 20B after the collision.

In the manner as described above, at least one of the second pretensioner 24 and the third pretensioner 30 is activated at the time of prediction of collision of the vehicle, so that the waist region W of the occupant P can be restrained before collision. As a result, it is possible to curb occurrence of a so-called submarine phenomenon in which the occupant P slides forward of the seat, under the lap belt portion 20B.

While the vehicular seat belt device 60 according to the embodiment has been described above, it is to be understood that this disclosure can be embodied in various forms, without departing from the principle of the disclosure. While the second pretensioner 24 and the third pretensioner 30 are activated at the same time after detection of collision in the above first embodiment, this disclosure is not limited to this arrangement. Namely, the time at which the second pretensioner 24 is activated may be shifted from the time at which the third pretensioner 30 is activated.

In the second embodiment, the ECU 48 activates the second pretensioner 24 when it predicts a collision of the vehicle, and activates the third pretensioner 30 after it detects the collision of the vehicle. However, the disclosure is not limited to this arrangement. For example, the ECU 48 may activate both the second pretensioner 24 and the third pretensioner 30 when it predicts a collision of the vehicle. In this case, the ECU 48 may activate the first pretensioner 22, after activating the second pretensioner 24 and the third pretensioner 30.

Further, in the second embodiment, the ECU 48 may activate the first pretensioner 22 after collision of the vehicle. Namely, the ECU 48 may activate the second pretensioner 24 and the third pretensioner 30 when it predicts a collision of the vehicle, and activate the first pretensioner 22 after it detects the collision. In this case, since the first pretensioner 22 is activated after detection of collision, tensile force can be applied to the shoulder belt portion 20A in a condition where the upper body of the occupant P in the reclined posture is raised due to the inertial force. As a result, the upper body of the occupant P is less likely or unlikely to be abruptly raised, and the capability of protecting the occupant P against collision can be improved.

Furthermore, the first embodiment and the second embodiment may be combined. In this case, the ECU 48 changes the order in which the pretensioners are activated, depending on the tilting angle of the seat back 16 at the time of collision of the vehicle. For example, when the seat back 16 is tilted back by an angle larger than a predetermined angle, the second pretensioner 24 is activated at the time of prediction of collision of the vehicle, and then the first pretensioner 22 is activated, as described above in the second embodiment. On the other hand, when the seat back 16 is not tilted back by an angle larger than the predetermined angle, the ECU 48 determines that the occupant P is in a driving posture, and it activates the first pretensioner 22 at the time of prediction of collision of the vehicle, and activates the second pretensioner 24 and the third pretensioner 30 at the same time after detection of collision.

What is claimed is:

1. A vehicular seat belt device comprising:
   a webbing having a first end portion that is wound on a retractor, and a second end portion that is attached to a belt anchor part disposed in a side portion of a vehicle seat, the webbing including a shoulder belt portion configured to restrain an upper body of an occupant, and a lap belt portion configured to restrain a waist region of the occupant;
   a first pretensioner provided in the retractor, and configured to apply tensile force to the shoulder belt portion when activated;
   a second pretensioner provided in the belt anchor part, and configured to apply tensile force to the lap belt portion when activated;
   a third pretensioner provided in a side portion of the vehicle seat opposite to the belt anchor part, and configured to apply tensile force to the shoulder belt portion and the lap belt portion, via a buckle with which a tongue plate is engaged, the webbing being passed through the tongue plate; and
   a controller configured to activate the first pretensioner at a time of predicting vehicle collision, when a seat back of the vehicle seat is in a driving state in which the seat back is stood up by an angle that is larger than a predetermined angle, and activate the second pretensioner and the third pretensioner after detection of collision.

2. The vehicular seat belt device according to claim 1, wherein:
   the retractor is provided in an upper portion of the vehicle seat; and
   the first pretensioner is an electric pretensioner installed on the vehicle seat and configured to be driven when supplied with electric power.

3. The vehicular seat belt device according to claim 2, wherein the second pretensioner and the third pretensioner are electric pretensioners installed on the vehicle seat and configured to be driven when supplied with electric power.

4. The vehicular seat belt device according to claim 2, wherein the controller is configured to increase tensile force applied from the first pretensioner to the shoulder belt portion after the detection of the collision, such that the tensile force becomes larger than tensile force applied from the first pretensioner to the shoulder belt portion at the time of the predicting vehicle collision.

5. The vehicular seat belt device according to claim 4, wherein the first pretensioner is configured to inhibit the webbing from being pulled out from the retractor, after the tensile force applied from the first pretensioner to the shoulder belt portion is increased.

6. The vehicular seat belt device according to claim 1, wherein the controller is configured to activate the second pretensioner and the third pretensioner at the same time after detection of the collision.

7. A vehicular seat belt device comprising:
a webbing having a first end portion that is wound on a retractor, and a second end portion that is attached to a belt anchor part disposed in a side portion of a vehicle seat, the webbing including a shoulder belt portion configured to restrain an upper body of an occupant, and a lap belt portion configured to restrain a waist region of the occupant;
a first pretensioner provided in the retractor, and configured to apply tensile force to the shoulder belt portion when activated;
a second pretensioner provided in the belt anchor part, and configured to apply tensile force to the lap belt portion when activated;
a third pretensioner provided in a side portion of the vehicle seat opposite to the belt anchor part, and configured to apply tensile force to the shoulder belt portion and the lap belt portion, via a buckle with which a tongue plate is engaged, the webbing being passed through the tongue plate; and
a controller configured to activate at least one of the second pretensioner and the third pretensioner, at the time of the predicting vehicle collision when a seat back of the vehicle seat is in a reclined state in which the seat back is tilted by an angle that is larger than a predetermined angle that is in a driving state, and then activate the first pretensioner.

8. The vehicular seat belt device according to claim 7, wherein the controller is configured to activate the first pretensioner after the detection of the collision.

9. The vehicular seat belt device according to claim 7, wherein the controller is configured to activate the second pretensioner and the third pretensioner at the time of the predicting vehicle collision.

10. The vehicular seat belt device according to claim 7, wherein the controller is configured to:
activate the second pretensioner at the time of the predicting vehicle collision; and
activate the third pretensioner after detection of collision.

11. The vehicular seat belt device according to claim 7, wherein the controller is configured to:
activate the second pretensioner at the time of the predicting vehicle collision;
activate the third pretensioner after detection of collision; and
activate the first pretensioner after the third pretensioner is activated.

12. The vehicular seat belt device according to claim 7, wherein the controller is configured to:
activate the second pretensioner and the third pretensioner at the time of the predicting vehicle collision; and
activate the first pretensioner after detection of collision.

* * * * *